United States Patent
Chiao

(10) Patent No.: US 10,286,465 B2
(45) Date of Patent: May 14, 2019

(54) BLADE GUIDE OF BAND SAW MACHINE

(71) Applicant: EVERISING MACHINE COMPANY, Taichung (TW)

(72) Inventor: Shu-Chia Chiao, Taichung (TW)

(73) Assignee: Everising Machine Company, Taichung (TW)

( * ) Notice: Subject to any disclaimer, the term of this patent is extended or adjusted under 35 U.S.C. 154(b) by 96 days.

(21) Appl. No.: 15/437,925

(22) Filed: Feb. 21, 2017

(65) Prior Publication Data

US 2018/0169776 A1    Jun. 21, 2018

(30) Foreign Application Priority Data

Dec. 20, 2016    (TW) .............................. 105219375 U

(51) Int. Cl.
 *B23D 55/08*    (2006.01)
 *B23D 59/00*    (2006.01)

(52) U.S. Cl.
 CPC ......... *B23D 59/001* (2013.01); *B23D 55/082* (2013.01)

(58) Field of Classification Search
 CPC ............................ B23D 59/001; B23D 55/082
 See application file for complete search history.

(56) References Cited

U.S. PATENT DOCUMENTS

| | | | | |
|---|---|---|---|---|
| 4,336,731 A * | 6/1982 | Eklund | ................... | B23D 53/00 83/74 |
| 5,070,751 A * | 12/1991 | Harris | ................... | B23D 55/084 83/62.1 |
| 6,412,380 B2 * | 7/2002 | Belfiglio | .............. | B23D 47/005 83/168 |
| 6,701,816 B2 * | 3/2004 | Smith | .................. | B23D 59/001 83/74 |
| 2010/0000326 A1 * | 1/2010 | Guo | ....................... | G01L 9/0072 73/724 |
| 2013/0276602 A1 * | 10/2013 | Washio | ................ | B23D 59/002 83/13 |
| 2015/0020660 A1 * | 1/2015 | Jeng | ...................... | B23D 59/001 83/74 |
| 2015/0068381 A1 * | 3/2015 | Sakai | ................... | B23D 55/082 83/820 |
| 2015/0128778 A1 * | 5/2015 | Jeng | ....................... | B23D 55/06 83/72 |

(Continued)

FOREIGN PATENT DOCUMENTS

| | | | | |
|---|---|---|---|---|
| DE | 10043012 A1 * | 5/2001 | .......... | B23D 55/082 |
| TW | I496639 B | 8/2015 | | |

*Primary Examiner* — Jonathan G Riley
(74) *Attorney, Agent, or Firm* — Wang Law Firm, Inc.

(57) ABSTRACT

A blade guide of a band saw machine includes a main member, on which two wheels, two holding blocks, a pressing block, and a pressure sensor are provided. The main member is provided with a slot, a hole, and an opening. The wheels are pivoted on the main member and received in the slot. The holding blocks are received in the hole, and a band saw passage is formed between the holding blocks. The band saw passage is communicated with the slot for a band saw passing therethrough. The pressing block is received in the hole to contact the band saw in the band saw passage. The pressure sensor is received in the opening and contacting the pressing block to detect a pressure of the pressing block.

7 Claims, 5 Drawing Sheets

(56) References Cited

U.S. PATENT DOCUMENTS

| | | | |
|---|---|---|---|
| 2015/0158097 A1* | 6/2015 | Myrfield | B23D 55/046 83/13 |
| 2015/0212512 A1* | 7/2015 | Butler | G05B 19/406 700/180 |
| 2016/0303669 A1* | 10/2016 | Harris | B23D 55/10 |
| 2017/0368622 A1* | 12/2017 | Krebber | B23D 55/005 |

* cited by examiner

BLADE GUIDE OF BAND SAW MACHINE

BACKGROUND OF THE INVENTION

1. Technical Field

The present invention relates to a band saw machine, and more particularly to a blade guide of a band saw machine.

2. Description of Related Art

Band saw machines are widely used in industrial cutting tasks. Normally, the workpieces to be cut are various, so that the band saw machine has to change the speed of a band saw according to the workpiece to obtain a good cutting quality. Typically, the speed of the band saw could increase while the workpiece is soft, and the speed should reduce while the workpiece is hard.

Another problem is that some workpieces have uneven internal structure, so it is not proper to cut such workpieces with a constant speed. Such problem normally is happened in cutting a big workpiece. Therefore, an idea cutting task could change the speed of the band saw according to the change of the internal structure of the workpiece.

Taiwan patent I496636 disclosed a conventional band saw machine which can adjust the speed according to the internal structure of the workpiece to be cut. The patent provides a pressure sensor to sense a loading of the bad saw when it is cutting a workpiece. The sensing result is sent to a processor to control the motor accordingly.

The prior art provides the pressure sensor on the shaft of the motor or on the shaft of the driven wheel, so that there is a time delay from the band saw cutting the workpiece to the motor changing the speed. Furthermore, it also has an inaccurate detection since the signal is transmitted to the pressure sensor through several elements.

BRIEF SUMMARY OF THE INVENTION

In view of the above, the primary objective of the present invention is to provide a blade guide of a band saw machine, which accurately detects the cutting loading of the band saw, and adjust the speed of the motor according to the detection to obtain a good cutting quality.

In order to achieve the objective of the present invention, a blade guide of a band saw machine includes a main member having a slot, a hole, and an opening, wherein the slot is communicated with the hole, and the opening is communicated with the hole; two wheel pivoted on the main member and received in the slot; two holding blocks received in the hole, wherein a band saw passage is formed between the holding blocks, and the band saw passage is communicated with the slot for a band saw passing therethrough; a pressing block received in the hole to contact the band saw in the band saw passage; and a pressure sensor received in the opening and contacting the pressing block to detect a pressure of the pressing block.

As a result, the pressure sensor can detect a precise loading of the band saw when it is cutting a workpiece, and send the pressure signal to a controller to control the motor accordingly.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
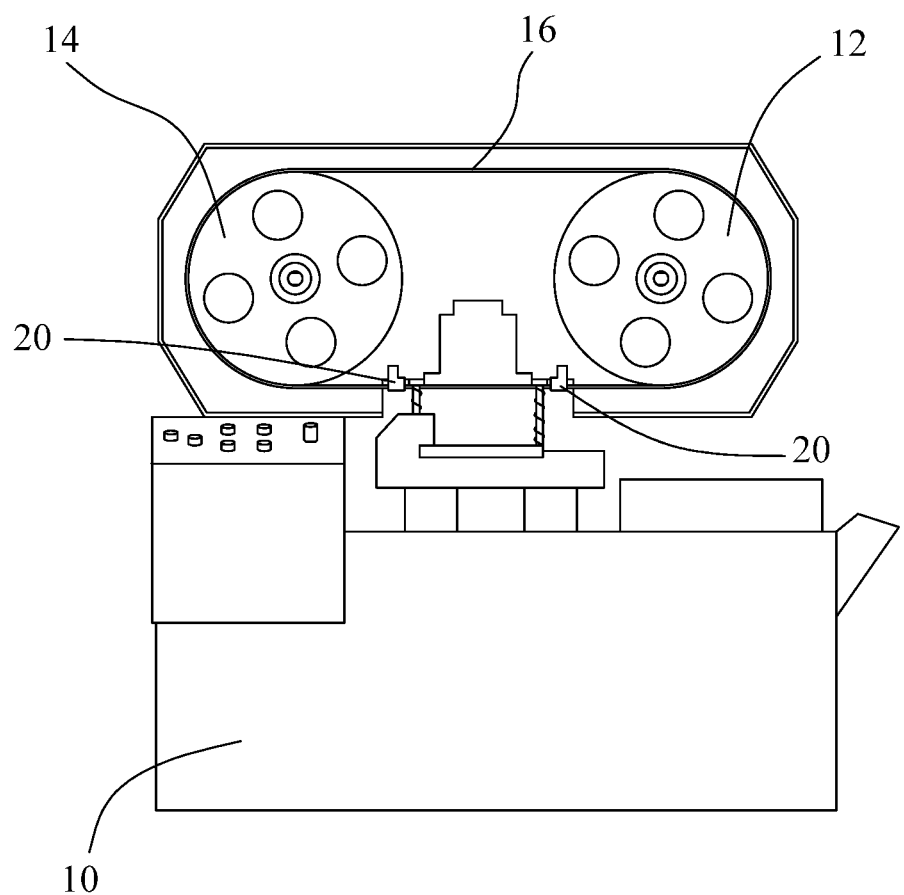
FIG. 1 is a perspective view of the band saw machine of a preferred embodiment of the present invention.
Figure 2:
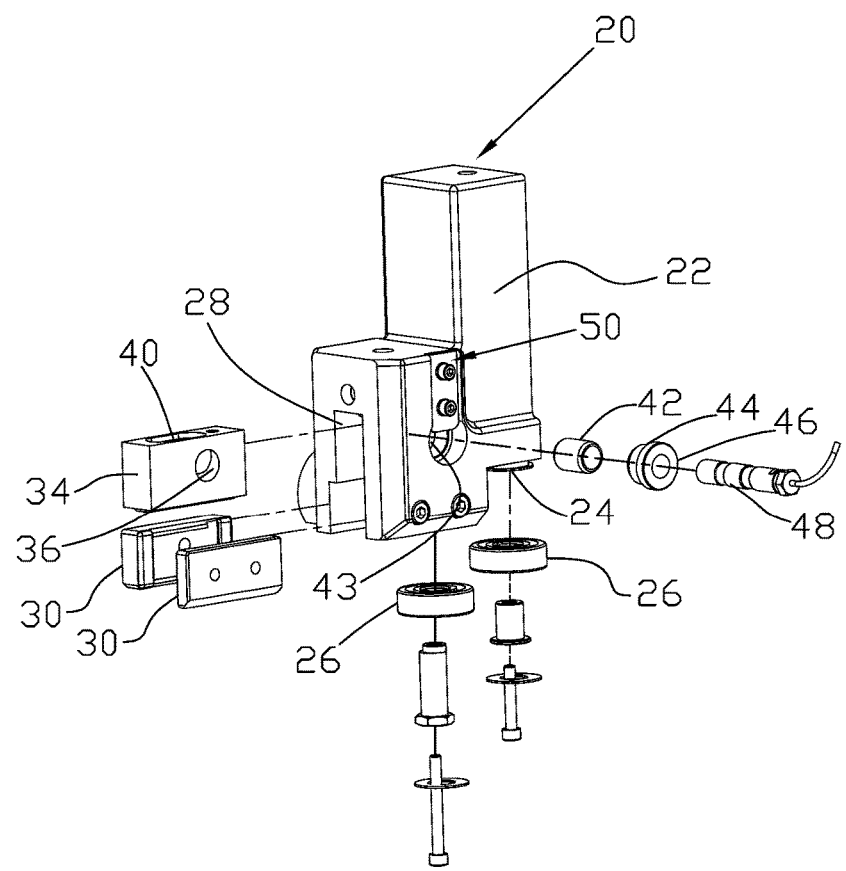
FIG. 2 is an exploded view of the blade guide of the preferred embodiment of the present invention.
Figure 3:
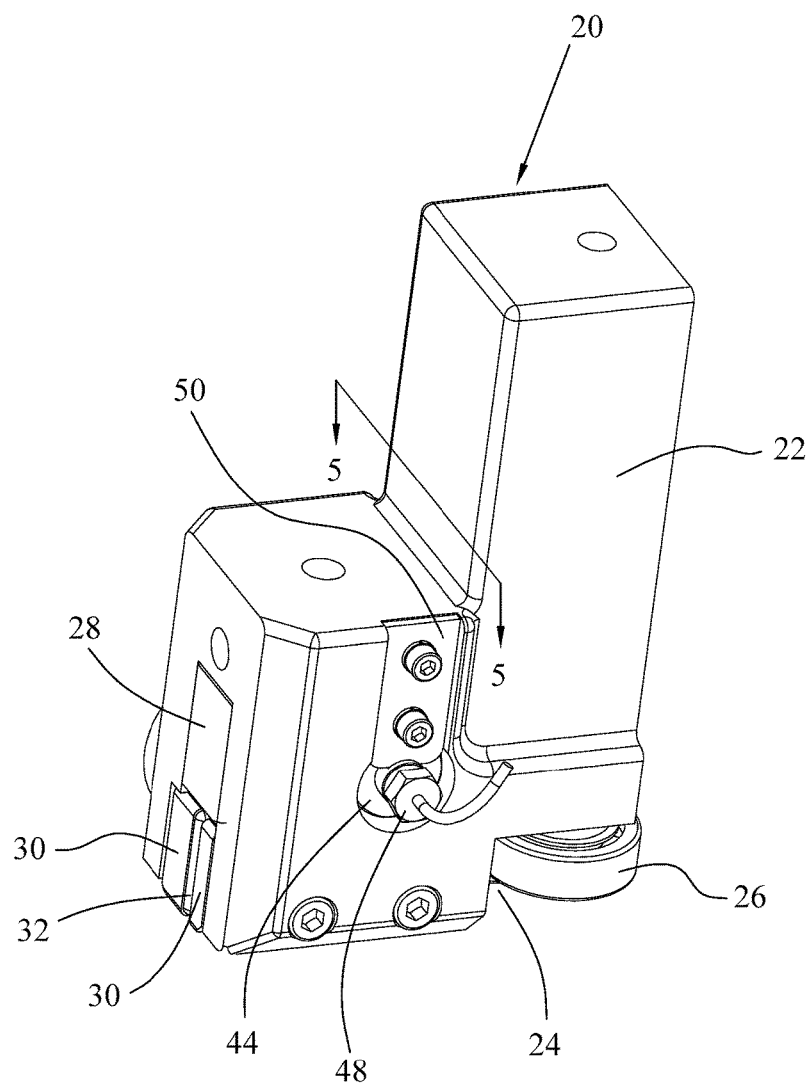
FIG. 3 is a perspective view of the blade guide of the preferred embodiment of the present invention.
Figure 4:
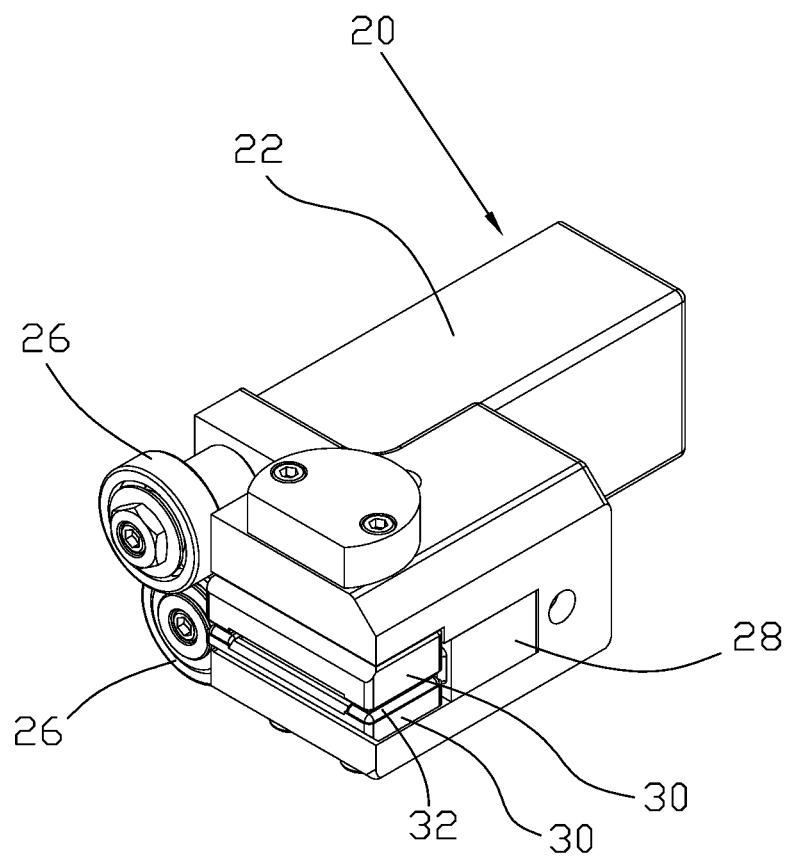
FIG. 4 is another perspective view of the blade guide of the preferred embodiment of the present invention.
Figure 5:
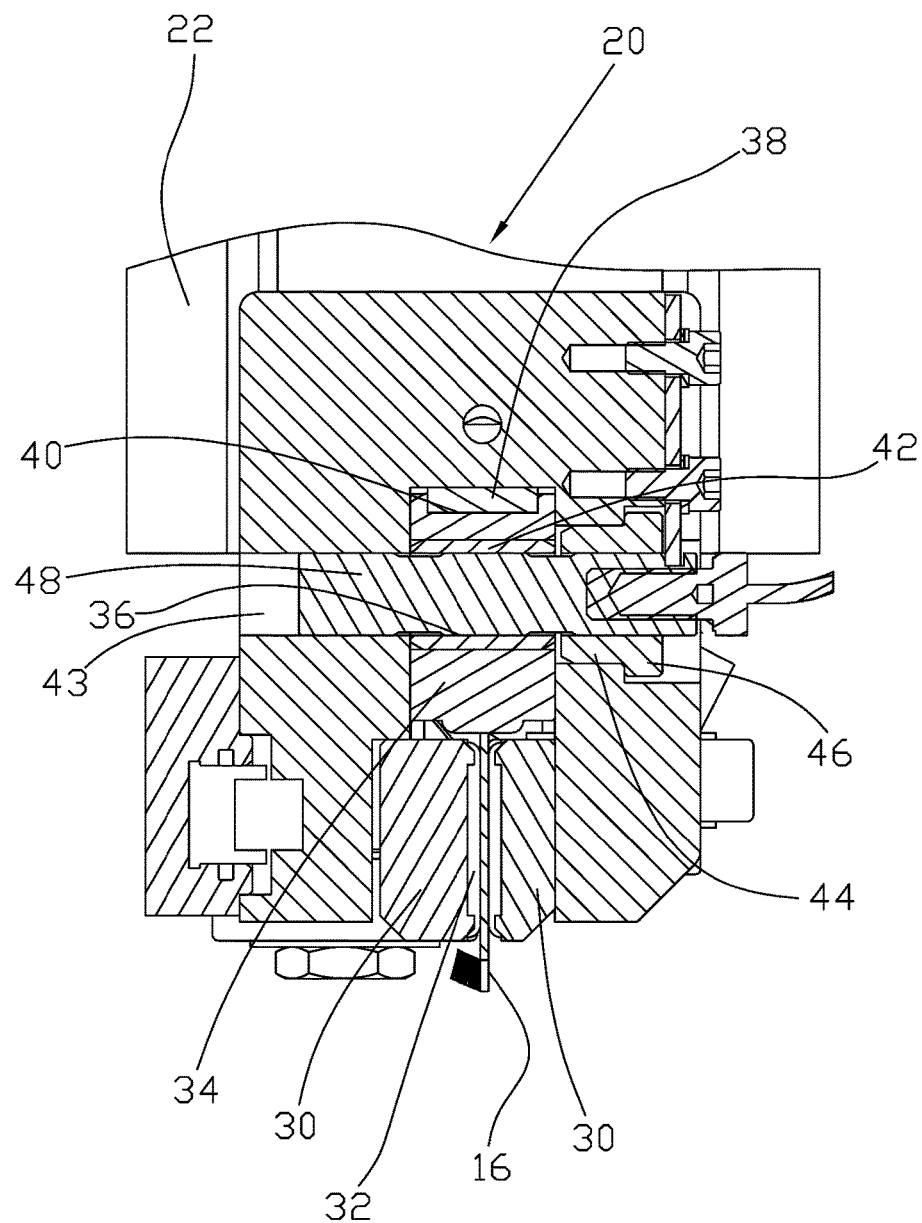
FIG. 5 is a sectional view of the 5-5 line in FIG. 3.

FIG. 1, a band saw machine of the preferred embodiment of the present invention, including a base 10, on which a driving wheel 12, a driven wheel 14, a band saw 16 looped over the driving wheel 12 and the driven wheel 14, a motor (not shown) driving the driving wheel 12 to turn, and two blade guides 20. The blade guides 20 change an angle of the band saw 14 to make teeth of the band saw face a workpiece (not shown).

As shown in FIGS. 2 to 5, each of the blade guides 20 has a main member 22. The main member 22 has a slot 24 on a bottom thereof, in which two wheels 26 are provided. In the present embodiment, the wheels 26 are at different levels. The main member 22 is provided with a hole 28 communicated with the slot 24. Two holding blocks 30 are received in the hole 28, and a band saw passage 32 is formed between the holding blocks 30. A pressing block 34 is received in the hole 28 and touches tops of the holding blocks 30. The pressing block 34 is provided with a bore 36 passing therethrough and recess 40 on a top thereof. An adjusting block 38 is received in the recess 40. A driven ring 42 is received in the bore 36 of the pressing block 38. The main member 22 further has an opening 43, which is aligned with the bore 36 of pressing block 34. A positioning ring 44 is received in the opening 43, and has a flange 46 at an end thereof. The flange 46 of the positioning ring 44 is greater than the opening 43 to abut against an edge of the opening 43. A pressure sensor 48 is received in the opening 43, and passes through the positioning ring 44 and the driven ring 42. The pressure sensor 48 is connected to a controller (not shown) of the band saw machine, and the controller controls the motor according to a sensing result of the pressure sensor 48. A lid 50 is fixed to the main member 22 to cover a portion of the opening 43, so as to secure the pressure sensor 48 in the opening 43.

In the present embodiment, the pressure sensor 48 is a column-like member, so that it connects the pressing block 34 to the main member 22 as well. In other words, the pressure sensor 48 serves both function of sensing pressure of the pressing block 34 and connecting the pressing block 34 to the main member 22. In another embodiment, the pressure sensor could be any shape.

Yet in an embodiment, the pressing blocks 30 are two rollers pivoted in the hole 28, and the band saw passage 32 is formed between the rollers for the band saw 16 passing therethrough.

The band saw 16 leaves the driven wheel 14, and then enters the blade guide 20 via a passage between the wheels 26, and the wheels 26 twist the band saw 16 to change it angle to let it able to enter the band saw passage 32 between the holding blocks 30. At this time, the band saw 16 is in a vertical status with teeth at a bottom edge. Next, the band saw 14 leaves the blade guide 20, and goes to the other blade guide 20. The band saw 14 enters the blade guide 20 via the band saw passage 32 between the holding blocks 30, and then goes to the passage between the wheels 26 to turn it back to horizontal status. It is noted that a workpiece is fixed at a position between the blade guides 20 to be cut by the band saw 16 is in the vertical status.

In an embodiment, the blade guide 20 closed to the driven wheel 14 is provided with a shaft (not shown) to replace the pressure sensor. In other words, only the blade guide 20 closed to the driving wheel 12 is equipped with the pressure sensor 48 to sense pressure as described above.

When the band saw 16 is cutting a workpiece, a counterforce forces the band saw 16 pressing the pressing block 34 directly, and it may be detected by the pressure sensor 48 through the driven ring 42. And then, the pressure sensor 48 transmits the detected pressure to the controller to control the motor accordingly.

It is obvious that the pressing block 34 is the first element contacting the band saw 16 when the band saw is cutting a workpiece. Therefore, the present invention provides an efficient and accurate way to sense the loading of the band saw to achieve an optimal cutting task.

It must be pointed out that the embodiments described above are only some preferred embodiments of the present invention. All equivalent structures which employ the concepts disclosed in this specification and the appended claims should fall within the scope of the present invention.

What is claimed is:

1. A blade guide of a band saw machine, comprising:
a main member having a slot, a hole, and an opening, wherein the slot is communicated with the hole, and the opening is communicated with the hole;
two wheels pivoted on the main member and received in the slot;
two holding blocks received in the hole, wherein a band saw passage is formed between the holding blocks, and the band saw passage is communicated with the slot for a band saw passing therethrough;
a pressing block received in the hole to contact the band saw in the band saw passage; and
a pressure sensor received in the opening and contacting the pressing block to detect a pressure of the pressing block
wherein the pressing block is provided with a bore, and the bore is aligned with the opening; the pressure sensor is inserted into both the opening of the main member and the bore of the pressing block to connect the pressing block to the main member;
wherein a direction of the bore is substantially perpendicular to a direction of the pressing block pressing the pressure sensor, whereby the pressure sensor is bent by the pressing block to detect the pressure.

2. The blade guide of claim 1, further comprising a driven ring received in the bore of the pressing block, wherein the pressure sensor is inserted into the driven ring.

3. The blade guide of claim 1, wherein further comprising a positioning ring received in the opening of the main member, wherein the pressure sensor is inserted into the positioning ring.

4. The blade guide of claim 2, wherein the positioning ring has a flange, which is greater than the opening to abut against an edge of the opening.

5. The blade guide of claim 1, wherein the pressing block is provided with a recess, in which an adjusting block is received.

6. The blade guide of claim 1, further comprising a lid fixed to the main member, and covering at least a portion of the opening.

7. A band saw machine, comprising:
a base;
a driving wheel and a driven wheel pivoted on the base respectively;
a band saw looped over the driving wheel and the driven wheel;
a motor connecting to the driving wheel to turn the driving wheel;
a controller provided on the base, and electrically connected to the motor to control the motor to turn; and
two blade guides provided on the base, wherein at least one of the blade guides comprises:
a main member having a slot, a hole, and an opening, wherein the slot is communicated with the hole, and the opening is communicated with the hole;
two wheels pivoted on the main member and received in the slot;
two holding blocks received in the hole, wherein a band saw passage is formed between the holding blocks, and the band saw passage is communicated with the slot;
wherein the band saw passes through the blade guide via a passage between the wheels and the band saw passage between the holding blocks;
a pressing block received in the hole to contact the band saw in the band saw passage; and
a pressure sensor received in the opening and contacting the pressing block to detect a pressure of the pressing block;
wherein the pressure sensor is electrically connected to the controller to transmit a detecting signal to the controller for the controller to control the motor accordingly
wherein the pressing block is provided with a bore, and the bore is aligned with the opening; the pressure sensor is inserted into both the opening of the main member and the bore of the pressing block to connect the pressing block to the main member;
wherein a direction of the bore is substantially perpendicular to a direction of the band saw pressing the pressing block, whereby the pressure sensor is bent by the pressing block to detect the pressure.

* * * * *